(12) United States Patent
Althukair et al.

(10) Patent No.: US 10,471,405 B2
(45) Date of Patent: Nov. 12, 2019

(54) CONTINUOUS GAS FLUIDIZED BED POLYMERIZATION PROCESS

(71) Applicant: SABIC Global Technologies B.V., Bergen op Zoom (NL)

(72) Inventors: Mohammed Althukair, Riyadh (SA); Abdulrahman Ashri, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 106 days.

(21) Appl. No.: 15/560,238

(22) PCT Filed: Mar. 24, 2016

(86) PCT No.: PCT/EP2016/056604
§ 371 (c)(1),
(2) Date: Sep. 21, 2017

(87) PCT Pub. No.: WO2016/151097
PCT Pub. Date: Sep. 29, 2016

(65) Prior Publication Data
US 2018/0056263 A1 Mar. 1, 2018

Related U.S. Application Data

(60) Provisional application No. 62/296,275, filed on Feb. 17, 2016.

(30) Foreign Application Priority Data

Mar. 24, 2015 (EP) ..................... 15160541

(51) Int. Cl.
*B01J 8/00* (2006.01)
*B01J 8/18* (2006.01)
*C08F 10/02* (2006.01)

(52) U.S. Cl.
CPC ............ *B01J 8/0015* (2013.01); *B01J 8/1827* (2013.01); *B01J 8/1836* (2013.01); *C08F 10/02* (2013.01);
(Continued)

(58) Field of Classification Search
CPC ...... B01J 8/0015; B01J 8/1827; B01J 8/1836; C08F 10/02
See application file for complete search history.

(56) References Cited

U.S. PATENT DOCUMENTS 4,543,399 A 9/1985 Jenkins, III et al.
4,588,790 A 5/1986 Jenkins, III et al.
(Continued)

FOREIGN PATENT DOCUMENTS

EP 1764378 A1 3/2007

OTHER PUBLICATIONS

U.S. Plastics, "What are the differences between HDPE, LDPE, XLPD, LLDPE, and UHMWPE?" (2008). (Year: 2008).*
(Continued)

*Primary Examiner* — Catherine S Branch
(74) *Attorney, Agent, or Firm* — Cantor Colburn LLP

(57) ABSTRACT

Process for the preparation of a polyolefin in a reaction system comprising a reactor comprising a fluidized bed and a distribution plate, product purge bin, and granular feed bin, wherein the process comprises feeding a polymerization catalyst to the fluidized bed, feeding α-olefin monomer(s) to the reactor, circulating fluids from the top of the reactor to the bottom of the reactor, withdrawing a stream comprising the polyolefin and fluids from the reactor and passing said stream into the product purge bin, purging the product purge bin with a purge stream comprising an inert gas to obtain a stream comprising a purged polyolefin and a stream comprising fluids, introducing part of the stream comprising fluids back into the reactor, introducing the stream comprising the purged polyolefin into the granular feed bin, and
(Continued)

contacting a deactivating stream with purged polyolefin in granular feed bin to obtain the polyolefin free of polymerization catalyst.

16 Claims, 1 Drawing Sheet

(52) U.S. Cl.
CPC .............. *B01J 2208/00274* (2013.01); *B01J 2219/00006* (2013.01)

(56) References Cited

U.S. PATENT DOCUMENTS

| | | | |
|---|---|---|---|
| 5,391,656 | A | 2/1995 | Campbell et al. |
| 7,381,777 | B1* | 6/2008 | Towles .................. C08F 10/02 526/59 |
| 2003/0228975 | A1* | 12/2003 | Ohtani .................. B01J 8/0015 502/152 |
| 2011/0190465 | A1* | 8/2011 | Hottovy .................. B01J 8/005 526/348 |

OTHER PUBLICATIONS

Hamielec et al.;"Polymerization Reaction Engineering—Metallocene Catalysts", Prog. Polym. Sci., 1996, vol. 21, pp. 651-706.
International Search Report for International Application No. PCT/EP2016/056604; dated Jun. 6, 2016; 5 pages.
Peacock, "Handbook of Polyethylene: Structures, Properties, and Applications", 2000, pp. 61-62.
Written Opinion of the International Search Report for International Application No. PCT/EP2016/056604; dated Jun. 6, 2016; 4 pages.

* cited by examiner

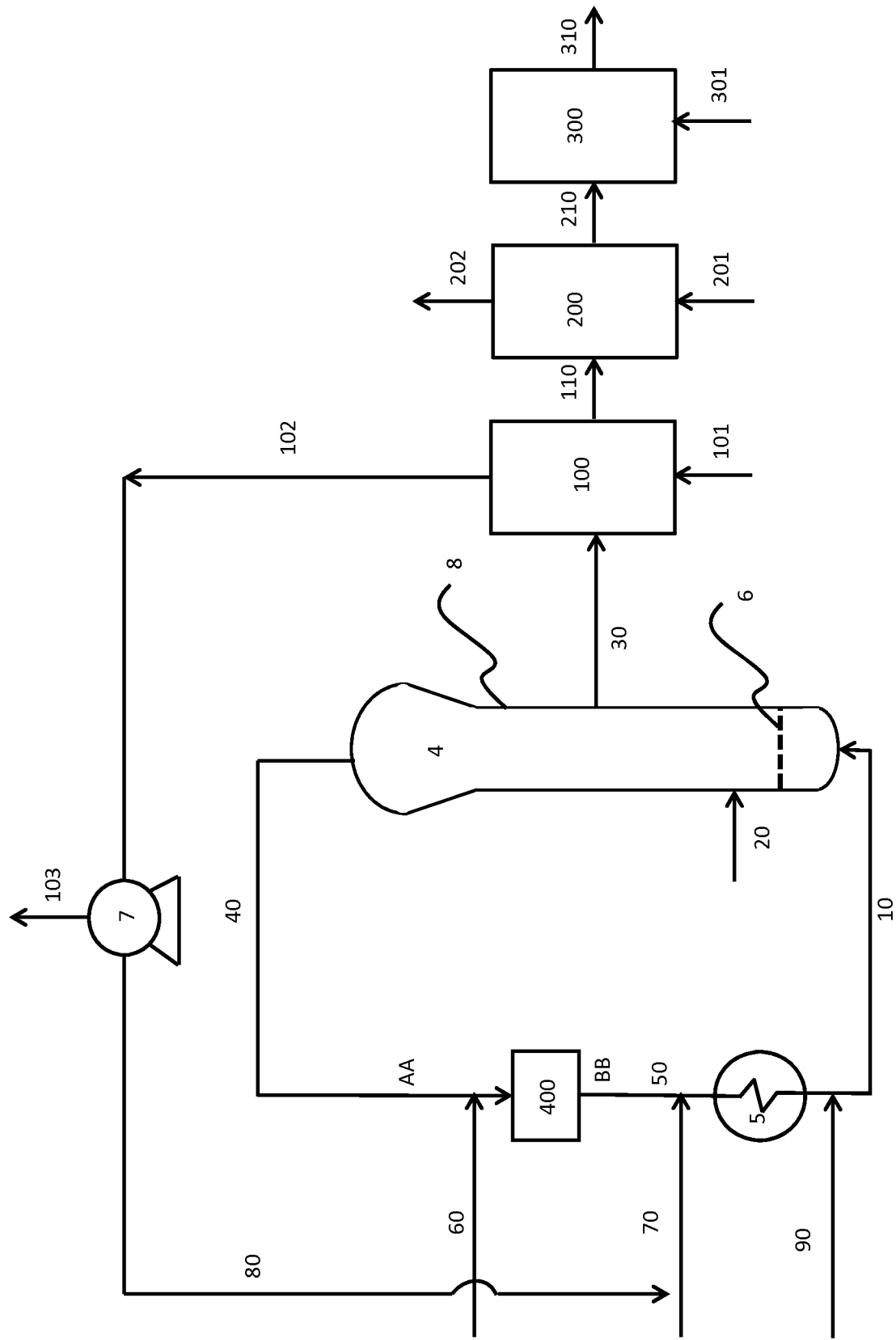

CONTINUOUS GAS FLUIDIZED BED POLYMERIZATION PROCESS

CROSS REFERENCE TO RELATED APPLICATIONS

This application is a 371 of International Application No. PCT/EP2016/056604, filed Mar. 24, 2016, which claims priority to European Application No. 15160541.7, filed Mar. 24, 2015, and U.S. Application No. 62/296,275 filed Feb. 17, 2016, all of which are incorporated herein by reference in their entirety.

The invention relates to a continuous gas fluidized bed polymerization process for the production of polymer from monomer.

A continuous gas fluidized bed polymerization process for the production of polymer from monomer is well known. In very general terms, a conventional fluidized bed process for producing resins, particularly polymers produced from monomers, is practiced by passing a gaseous stream containing one or more monomers continuously through a fluidized bed reactor under reactive conditions and in the presence of catalyst. The gaseous stream containing unreacted gaseous monomer and other components is withdrawn from the reactor continuously, compressed, cooled and recycled into the reactor. Product is withdrawn from the reactor. Make-up monomer is added to the recycle stream.

Gas fluidized bed polymerization plants generally employ a continuous loop. In one part of the loop, a cycling gas stream is heated in the reactor by the heat of polymerization. This heat is mainly removed in another part of the loop by a cooling system external to the reactor.

An efficient way to achieve heat removal is by cooling the gaseous recycle stream to a temperature below its dew point, resulting in the condensation of at least part of the recycle stream to form a cooled recycle stream containing liquid and gas. An inert condensing agent is combined with the recycle stream to raise the dew point. The thus formed cooled recycle stream is then introduced into the fluidized bed polymerization reactor, where the liquid portion will vaporize upon exposure to the heat of the reactor, which vaporization will remove more heat from the reactor. This mode of operation is known in the art as a "condensing mode" or "condensed mode" process and is described e.g. in U.S. Pat. Nos. 4,543,399 and 4,588,790.

The polymer produced in the reactor is withdrawn to to a product purge bin. The product purge bin is purged by inert gas in order to remove dissolved hydrocarbons from the polymer produced. At least part of the removed components is recovered in a recovery system to be recycled back to the reactor.

The polymer in the product purge bin also contains residual catalyst. Steam or another deactivating component is usually fed to the product purge bin for deactivating the residual catalyst in order to avoid discoloration (yellowing) of the final polymer.

A sufficient amount of steam has to be fed to the product purge bin in order to ensure deactivation of the catalyst. If however, the product purge bin has a limitation in the amount of steam that it can handle, i.e. if too much steam is fed to the product purge bin, the excess steam ends up in the recovery system and subsequently in the reactor. Steam deactivates the catalyst in the reactor, which must be avoided. The amount of steam added to the product purge bin should therefore correspond to the amount of the residual catalyst. It is however difficult to measure the amount of the residual catalyst in the polymer in the product purge bin and in some cases, the design or capacity of the product purge bin may not be sufficient to deactivate all residual catalyst.

There is a need for a process in which polymer with substantially no active catalyst can be obtained independent on the capacity of the product purge bin.

It is an object of the invention to provide a process in which the above and/or the problem is solved.

This object is achieved by a process for the preparation of a polyolefin in a reaction system from one or more α-olefin monomers of which at least one is ethylene or propylene, wherein the reaction system comprises a reactor, a product purge bin, a granular feed bin, wherein the granular feed bin is located downstream of the product purge bin, a recovery unit and an extrusion unit directly coupled to the granular fed bin,
wherein the reactor comprises a fluidized bed, an expanded section located at or near the top of the reactor, a distribution plate located at the lower part of the reactor and an inlet for a recycle stream located under the distribution plate,
wherein the process comprises
a) feeding a polymerization catalyst to the fluidized bed in the area above the distribution plate,
b) feeding the one or more α-olefin monomers to the reactor,
c) circulating fluids from the top of the reactor to the bottom of the reactor, wherein the circulating fluids are cooled using a heat exchanger, resulting in a cooled recycle stream comprising liquid, and wherein the cooled recycle stream is introduced into the reactor using the inlet for the recycle stream,
d) withdrawing a stream comprising the polyolefin and fluids from the reactor and passing said stream into the product purge bin,
e) purging the product purge bin with a purge stream comprising a first inert gas, preferably nitrogen and steam such that a stream comprising a purged polyolefin and a stream comprising fluids, wherein the stream comprising the fluids is substantially free of steam, is obtained,
f) introducing at least part of the stream comprising the fluids back into the reactor via the recovery unit,
g) introducing the stream comprising the purged polyolefin into the granular feed bin and
h) contacting a deactivating stream comprising steam with the purged polyolefin in the granular feed bin to obtain a polyolefin that is substantially free of active polymerization catalyst.

According to the process of the invention, the removal of the dissolved hydrocarbon from the polyolefin produced in the reactor is mainly performed in the product purge bin and the deactivation of the polymerization catalyst is completed in the granular feed bin.

The polyolefin in the product purge bin is purged with a purge stream to remove the reactants and other components withdrawn from the reactor from the polymeric product and to (partly) deactivate the residual polymerization catalyst. The purge gas from the product purge bin is fed to a recovery system in order to recover part of the components removed from the polyolefin, which is recycled back to the reactor. The amount of steam in the purge stream is selected sufficiently low such that the stream from the product purge bin to the recovery system is substantially free of steam. The stream from the recovery system may therefore be reintroduced to the reactor without having the risk of the steam killing the catalyst.

As is known to the person skilled in the art, the nitrogen in the purge stream is preferably of ambient temperature and when combined with steam of above the condensation temperature of steam.

If the deactivation of the residual catalyst in the polyolefin in the product purge bin is insufficient, the purged polyolefin may still contain residual active polymerization catalyst. According to the invention therefore, this purged polyolefin is withdrawn to the granular feed bin. The purged polyolefin is contacted with a deactivating stream to deactivate the remaining catalyst. The amount of steam in the deactivation stream is selected sufficiently high such that the resulting polyolefin product is substantially free of active polymerization catalyst. There is essentially no upper limit to the amount of steam used for the deactivation in the granular feed bin since the stream from the granular feed bin does not need to be recycled back to the reactor but may be treated in a different way, e.g. fed to a flare.

Accordingly, the catalyst deactivating capacity of the reaction system is increased by the use of the granular feed bin for the catalyst deactivation. It is an advantage of the present invention that polyolefin with substantially no active polymerization catalyst (i.e. reduced yellowness) are obtained even if the purging of the polyolefin in the product purge bin is insufficient, while at the same time, the stream from the recovery system can be recycled back to the reactor without the risk of deactivating the catalyst in the reactor.

With 'the stream comprising the fluids is substantially free of steam' is meant that the amount of steam with respect to the stream is at most 5, preferably at most 4, more preferably at most 3, most preferably at most 2 ppmv (part per million volume).

With 'polyolefin that is substantially free of active polymerization catalyst' is meant that the amount of active polymerization catalyst is such that the Hunter B-value (B-index) measured as indicated herein of the polyolefin is less than 2, preferably less than 1.5, more preferably less than 1.3, even more preferably less than 1.0.

With 'catalyst' as used herein is meant to include both catalyst and cocatalyst, and any other compounds which assist in catalyzing the production of the polyolefin.

With 'fluidized bed' as used herein is meant that an amount of particles in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

With 'continuous polymerization of one or more α-olefins' or 'continuous preparation of polyolefin' is meant herein that one or more α-olefin monomers of which at least one is ethylene or propylene are fed to the reactor and polyolefin thus produced is (semi)-continuously withdrawn through a polymer discharge system connected to the reactor.

The process according to the invention is a process for the preparation of a polyolefin from one or more α-olefin monomers of which at least one is ethylene or propylene. Preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80%, for example at least 90%, for example at least 95%, for example at least 98%, for example at least 99% by weight based on the total copolymer.

Reaction System and Reactor

The reaction system comprises a reactor, a product purge bin and a granular feed bin. The granular feed bin is located downstream of the product purge bin. The reaction system further comprises a recovery unit connected to the product purge bin for receiving a stream from the product purge bin and recycling recovered fluids to the reactor. The system further comprises an extrusion unit directly coupled to the granular feed bin.

A reactor is herein meant a vessel designed for reactions to take place therein, comprising inlets for receiving feed materials and outlets for discharging reaction products.

The reactor comprises a fluidized bed, an expanded section located at or near the top of the reactor, a distribution plate located at the lower part of the reactor and an inlet for a recycle stream located under the distribution plate.

A product purge bin is herein meant a vessel designed for receiving products and removing any undesired materials from the products by a purge stream. The product purge bin receives a stream comprising polyolefin and a purge stream removes dissolved hydrocarbons from the polyolefin.

The recovery unit is herein meant a system designed for receiving a mixture of components and separating desired components from the mixture. Typically, the mixture comprises unreacted materials from a reaction process (e.g. (e.g. unreacted monomers from a polymerization process), which are separated from the mixture and recovered. The recovery unit receives a stream from the product purge bin and passes on the recovered components to be recycled back to the reactor. The details of the recovery unit are described in relation to step f).

The expanded section located at or near the top of the reactor is not intended for gas-phase polymerization, but instead is suitable for gas expansion. It has the function to disengage the reaction mixture and the polymer product of the reaction. Accordingly, this section does not function as a reaction zone. The superficial gas velocity may be of such low value that polymer particles preferably do not enter into the top zone, preferably at least so that the recycle stream is sufficiently free of particles for example to avoid clogging to occur in the compressor.

In such reactor, during the course of polymerization, fresh polymer particles are produced by catalytic polymerization of α-olefin monomers. Such polymer particles are projected upwards in the direction of the expanded section through the circulating gas. Most of these particles do preferably not reach the expanded section or return to the fluidized bed by gravity as the superficial gas velocity decreases in the expanded section.

The distribution plate may be any device that is suitable for distributing the cooled recycle stream in the reactor to keep a fluidized bed and to serve as a support for a quiescent bed of the polymerization catalyst and polyolefin when the reactor is not in operation. The distribution plate is used for achieving good gas distribution. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting.

The distribution plate is generally positioned perpendicular to the longitudinal axis of a reactor, wherein the fluidized bed is located above said distribution plate and a mixing chamber region below said distribution plate.

In addition to the distribution plate, the reactor may be further equipped with other means for agitation, such as mechanical agitation, for example a stirrer. Preferably, the reactor does not comprise mechanical agitation.

The process and the system of the invention are described below in detail referring to FIG. 1 which schematically illustrates an example of the system of the invention. The FIGURE as used herein is meant to illustrate the invention but is by no means meant to limit the invention thereto.

step a)

A polymerization catalyst is fed to the fluidized bed in the area above the distribution plate.

The polymerization catalyst may be fed to the reactor for example by using feeding means, such as a pump. The polymerization catalyst may for example be fed as a suspension in a solvent, for example a hydrocarbon solvent or the like, or in an inert gas, such as nitrogen (dry catalyst). The polymerization catalyst may also be injected into the fluidized bed.

The polymerization catalyst may be fed at any position in the area above the distribution plate or at a combination of positions in the reactor.

The person skilled in the art is aware of which catalysts are suitable for continuous polymerization of monomers such as α-olefin monomers.

For example, heterogeneous polymerization catalysts, which are catalysts that are supported on an inert substrate, for example silica or alumina may be used. Suitable examples of heterogeneous catalysts include supported Ziegler Natta and supported metallocene catalysts and combinations thereof, for example in a mixed catalyst system. Examples of a catalyst composition for polymerization of α-olefins comprising at least two catalytic components are for example described in EP1764378A1, hereby incorporated by reference. EP1764378A1 discloses a catalyst composition comprising a metallocene component and a Ziegler-Natta type transition metal component, at least one activator and support material. Metallocene catalysts are for example described by Hamielec and Soares in "Polymerisation reaction engineering-metallocene catalysts" (Prog. Pol. Sci. Vol. 21, 651-706, 1996), hereby incorporated by reference. The polymerization catalyst may also be a metal oxide catalyst, for example a chromium oxide catalysts. Such metal oxide catalyst may for example be based on a support of an inert substrate, for example on silica, alumina silicate or alumina, for example on a highly porous support of silica, alumina silicate or alumina as for example disclosed in the "Handbook of Polyethylene" by Andrew Peacock at pages 61-62, hereby incorporated by reference.

The group of metallocene catalysts includes many variations. In the most general form, metallocene catalysts comprise a metal atom, for example titanium, zirconium or hafnium attached to for example four ligands, for example two substituted cyclopentadienyl ligands and two alkyl, halide or other ligands with an optionally modified organo-alumoxane as activator, for example methylaluminoxane (MAO) or a compound based on boron. Examples of inert substrates that can be used as support for a metallocene catalyst include inorganic oxides, for example $SiO_2$, $MgCl_2$, $Al_2O_3$, $MgF_2$ and $CaF_2$. Preferably, the polymerization catalyst used in the system and process of the invention is a metallocene catalyst supported on silica, for example a silica as commercially available, for example Grace Davison 948 silica or Ineos ES 70 silica.

A Ziegler Natta catalyst may be used together with a cocatalyst in the system and process of the invention. Suitable example of cocatalysts include but are not limited to organo aluminium compounds having formula $AlR_3$, wherein R stands for a hydrocarbon having 1 to 10 C-atoms. Examples of organo aluminium compounds having formula $AlR_3$ include triethylaluminium alkyl, triisobutyl aluminium trialkyl, tri-n-hexyl aluminium and tri octyl aluminium.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

It will be clear to the person skilled in the art that also mixtures of polymerization catalysts may be used in the invention.

step b)

The one or more α-olefin monomers may be fed to the reactor (8) using feeding means such as a pump. The monomers are preferably fed to the reactor (8) by adding the monomers to the fluids that are circulated from the top of the reactor to the inlet for the recycle stream prior to cooling of the fluids. Preferably, the one or more α-olefin monomers are added in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in the feed (60) and another type of α-olefin monomer, also referred to herein as the comonomer, may be comprised in the feed (70).

step c)

Fluids are circulated from the top of the reactor to the bottom of the reactor. The circulating fluids are cooled using a heat exchanger, resulting in a cooled recycle stream comprising liquid. The cooled recycle stream is introduced into the reactor using the inlet for the recycle stream.

For the avoidance of doubt the term 'fluids' encompasses liquids, gases and mixtures thereof, wherein the term 'liquids' includes liquids containing solid particles, such as slurries.

The fluids may be cooled to below the dew point of the fluids using any suitable cooling means. For example, cooling of the fluids may be performed using a cooling unit, for example a heat exchanger.

The dew point may be increased by increasing the operating pressure of the fluids and/or by increasing the percentage of condensable fluids and simultaneously decreasing the percentage of non-condensable gases in the fluids.

By feeding the fluids that are cooled to below the dew point of the fluids into the bottom inlet of the reactor, the fluids will be passed through the distribution plate (6) into the section above the distribution plate (6), resulting in the formation of a fluidized bed and/or a bubble column. Heat generated by the polymerization will cause the liquids in the fluids to evaporate. The feeding of the polymerization catalyst and the one or more α-olefin monomers to the reactor (8) will result in the formation of polyolefin (30), which is withdrawn from the reactor (8). The recycle stream is recirculated from the top of the reactor to the bottom inlet. The one or more α-olefin monomers and other fluids, such as hydrogen, an inert gas or liquid, for example a condensable inert component, may be added to the recycle stream to make up for the target composition (there is loss due to e.g. reaction, withdrawal and venting) before cooling the fluids to below the dew point of the fluids to form a cooled recycle stream.

A special embodiment of this system is schematically represented in FIG. 1 without however being limited thereto. The system of FIG. 1 is only one of numerous possible schematic arrangements. Thus, for example, the sequence of the equipment items in the circulated gas line, particularly of the cooler and compressor can also be reversed or further equipment items can be integrated into the line. Further elements such as systems for metering-in the catalyst are not shown in FIG. 1, such elements are known to those skilled in the art and can be integrated into the reactor in a known manner.

FIG. 1 illustrates a system suitable for continuous polymerization of one or more α-olefin monomers of which at least one is ethylene or propylene, comprising a reactor (8), a compressor (400) and a cooling unit (5), a product purge bin (100), a granular feed bin (200), a recovery unit (7) and an extrusion unit (300) directly coupled to the granular fed bin, wherein the reactor (8) comprises an inlet for receiving a cooled recycle stream (10),
an inlet for receiving a polymerization catalyst (20),
an outlet for providing polyolefin (30) to the product purge bin (100),
an expanded section (4) comprising an outlet for a recycle stream (40),
wherein the outlet for the recycle stream (40) of the expanded section is connected to an inlet of the compressor (400) via a first connection means (AA), for instance pipes wherein the compressor (400) comprises an outlet for compressed fluids (50),
wherein the outlet of the compressor (400) is connected to an inlet for compressed fluids of the cooling unit (5) via a second connection means (BB)
wherein optionally the second connection means (BB), for instance pipes, comprises an inlet for receiving a feed (70), wherein the cooling unit (5) comprises an outlet for providing the cooled recycle stream (10) which outlet of the cooling unit (5) is connected to the inlet of the reactor (8) for receiving the cooled recycle stream (10),
wherein the first connection means (AA) may comprise an inlet for receiving a feed (60).

The product purge bin (100) has an outlet for a stream (102) comprising the inert gas, which is connected to the inlet of the recovery system (7). The outlet for the recovered components (in liquid form) (80) from the vent gas recovery system (7) may be connected to the inlet (70) of the second connection means (BB).

An inlet for receiving a feed (90) may optionally (also) be connected to the cooled recycle stream downstream of the cooler and upstream of the inlet of the reactor for receiving the cooled recycle stream.

This system can suitably be used for a process for continuous polymerization of one or more α-olefin monomers of which at least one is ethylene or propylene in the system of the invention comprising
supplying the reactor with a polymerization catalyst using the inlet for receiving the polymerization catalyst (20)
supplying a feed (60) comprising an α-olefin monomer to the first connection means (AA)
withdrawing the polyolefin (30) from the reactor (8) to the product purge bin (100) and
circulating fluids from the outlet of the expanded section (4) to the inlet of the reactor for receiving a cooled recycle stream (10),
wherein the fluids are circulated by
compressing the mixture of the feed (60) and the recycle stream (40) using the compressor (400) to form the compressed fluids (50)
subsequently cooling the compressed fluids (50) using the cooling unit (5) to below the dew point of the compressed fluids to form the cooled recycle stream (10) and
feeding the cooled recycle stream (10) to the reactor (8) via the inlet for receiving the cooled recycle stream.

The feed (60) comprises a chain transfer agent, for example hydrogen and may further comprise gaseous α-olefin monomers and inert gaseous components, for example nitrogen.

The feed (70) or the feed (90) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

Preferably, when producing polyethylene, inlet (70) and/or inlet (90) are used for the introduction of the make up components as exemplified above, more preferably inlet (70) is used.

The condensable inert component is preferably selected from the group of isopentane, n-hexane, n-butane, i-butane and mixtures thereof. Because of their more attractive pricing, preferably isopentane and/or n-hexane are/is used as condensable inert component(s) in the feed (70)

When copolymers are produced, the process of the invention further comprises supplying a comonomer using feed (60) or (70) in case of a non-condensable comonomer and using feed (70) in case of a condensable comonomer.

The cooled recycle stream (10) comprises a fluid stream comprised of gas and liquid.

Preferably in the processes of the invention, the fluids are cooled to such extent that the amount of liquid in the cooled recycle stream (10) is at least 7% by weight, for example at least 9%, for example at least 14% by weight based on the total amount of liquid and gas. For example, the amount of liquid in the cooled recycle stream is at least 14.5%, for example at least 20%, for example at least 25% and/or for example at most 95%, for example at most 90%, for example at most 90%, for example at most 85%, for example at most 80%, for example at most 75%, for example at most 70%, for example at most 65%, for example at most 60%, for example at most 55%, for example at most 55% by weight based on the total amount of liquid and gas in the cooled recycle stream. Preferably, the amount of liquid in the cooled recycle stream is at least 25% and for example at most 55% by weight based on the total amount of liquid and gas in said cooled recycle stream.

High amounts of liquid in the cooled recycle stream enables feeding of one or more very high activity catalyst system.

The compressor (400) may be any device that is suitable for compressing the feed (60) and the recycle stream (40) using the compressor (400) to form the compressed fluids (50). By compressing the feed (60) and the recycle stream (40), the pressure of the compressed fluids (50) is increased compared to the feed (60) and the recycle stream (40) before use of the compressor (400).

The cooling unit (5) may be any device that is suitable for cooling the compressed fluids (50) to below the dew point of the compressed fluids to form the cooled recycle stream (10). For example, a heat exchanger may be used as the cooling unit (5).

The recycle stream (40) contains fluids that are withdrawn from the outlet of the expanded section of the reactor (8).

The first connection means (AA) and the second connection means (BB) can in principle be any means for connecting the outlet of the expanded section (4) and the inlet of the compressor (400), and the outlet of the compressor (400) and the inlet of the cooling unit (5), respectively.

Hydrogen may for instance be used as a chain transfer agent to adjust the molecular weight of the polyolefin (30) produced.

The continuous polymerization of one or more α-olefin monomers will produce polyolefins in the form of particles, herein also referred to as 'polyolefin' (30). Examples of polyolefins which may thus be produced include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the process of the invention, the polyolefin produced is a polyethylene, more preferably a linear low density polyethylene or a high density polyethylene.

Depending on which polyolefin is to be produced, the optimal reaction conditions can easily be determined by the person skilled in the art.

step d)

A stream comprising the polyolefin (30) and fluids is withdrawn from the reactor (8) and the stream is passed into the product purge bin (100). The fluids may comprise unreacted (co)monomers, catalysts, chain transfer agent (e.g. hydrogen), inert gas and condensable fluid.

step e)

The product purge bin (100) is purged with a purge stream (101) comprising a first inert gas, preferably nitrogen, and steam. The purging is done such that a stream (110) comprising a purged polyolefin and a stream (102) comprising the first inert gas and fluids are obtained, wherein the stream (102) comprising the first inert gas and fluids is substantially free of steam.

The purge gas (101) functions as: i) purger for dissolved hydrocarbons within the polyolefin (mainly by the first inert gas such as (ambient) nitrogen) and ii) deactivator of residual catalyst remaining in the polyolefin (mainly by steam in combination with nitrogen above the condensation temperature of steam). In the absence of purging, it would not be possible to recycle the dissolved hydrocarbons and they would diffuse out of the polyolefin downstream in the process and would form an explosive gas mixture if contacted with air.

The purging is typically accomplished in the product purge bin (100) by blowing a purge gas countercurrently up from the bottom of the product purge bin (100) through the polymer. This flushes out entrained reactor fluids and strips and desorbs dissolved hydrocarbons out of the product polymer (also referred to herein as polyolefin and polymer product).

After the purge stream contacts with the polyolefin, a stream (102) is obtained which contains the first inert gas and fluids removed from the polymer product. The amount of steam in the purge stream (101) is selected such that all steam reacts with the residual catalyst in the polyolefin, i.e. the resulting stream (102) is substantially free of steam.

A stream (110) comprising a purged polyolefin is obtained by the purging, which comprises reduced amounts of dissolved hydrocarbons. The purged polyolefin may still contain some amount of active polymerization catalyst.

The stream (102) comprising the first inert gas and fluids is further processed in step f). The purged polyolefin is further processed in in steps g) and h).

step f)

The stream (102) comprising the first inert gas and fluids is introduced from the product purge bin (100) to a recovery system (7). At least part (80) of the fluids is recovered in the recovery system (7) and recycled back to the reactor (8). Typically, the fluids recycled are (co)monomers and condensable fluids in liquid form. The recovered fluids (80) from the recovery system (7) may be combined with the fluids (50) from the top of the reactor (8) before being recycled back to the reactor (8). The gaseous components (103) of the fluids are typically not recycled back to the reactor but reused in other parts of the reaction system.

A recovery system, which is also called a vent gas recovery system, is well-known. Any known vent gas recovery system may be used in the process according to the invention. Existing methods of the vent gas recovery system include: a) compression and condensation with water and/or mechanical refrigeration (for example cooling to −10° C.); and b) separation via pressure swing absorption (PSA) or membranes. In existing gas phase polyethylene plants, Option (a) is most commonly applied, but a combination of (a) and (b) has also been used.

In a compression and condensation system, such as described in U.S. Pat. No. 5,391,656, the stream from the polymer purge bin is treated in a series of steps that include: cooling to condense a portion of the reactor gas stream; separating the condensed liquids from the remaining non-condensable gases; compressing the non-condensable gases; cooling the compressed stream to promote further condensing, further liquid/gas separation, and further recycle of condensed monomers. The compression and cooling vent recovery system provide recovery of a high percentage of the heavier contained hydrocarbons, for example butene, isopentane, hexene, hexane, and other heavy alkenes and alkanes, through the condensation process.

Another recovery method contemplated in the art involves cryogenic vent recovery, wherein condensation of monomer from vent streams containing nitrogen is accomplished by vaporization of liquid nitrogen. Commercially available cryogenic vent recovery systems used for cryogenic vent recovery typically rely on importing liquid nitrogen from another facility at site, importing liquid nitrogen from an off-site facility, or sending the vent to an off site facility to recover the condensable hydrocarbons as a refuse stream.
step g)

The stream (110) comprising purged polyolefin is withdrawn from the product purge bin (100) to a granular feed bin (200).

A granular feed bin (200) is a container connected to an extrusion unit (300) for producing products such as pellets. Preferably, the granular feed bin (200) comprises an inverted cone to disperse the stream (201). Additives (301) may be added to the extrusion unit (300) to produce the resulting polyolefin with optional additives (310).

Preferably, nitrogen is added to the stream (110) comprising the purged polyolefin, after which the stream (110) comprising the purged polyolefin and nitrogen is introduced into the granular feed bin. This advantageously ensures that steam from the granular feed bin (200) is prevented from coming into the product purge bin (100) or analyzer just below the product purge bin (100).
step h)

The granular feed bin (200) is supplied with a deactivating stream (201) comprising steam to deactivate the residual catalyst in the purged polyolefin. The deactivating stream (201) may additionally comprise a second inert gas. Preferably, the second inert gas, preferably nitrogen is added to the deactivating stream in step h) such that condensation of the steam is avoided, preferably by adding nitrogen above the condensation temperature of steam.

The amount of steam is chosen such that the resulting polyolefin is substantially free of activate polymerization catalyst. The deactivation stream (202) after contact with the purged polyolefin does not need to be recycled back to the reactor. It may be fed to other parts of the system, e.g. flare. Hence there is no upper limit in the amount of steam used in the granular feed bin (200), assuring the deactivation of substantially all catalyst in the polyolefin.

The purged polyolefin from the product purge bin (100) remains in the granular feed bin (200) for a period sufficient for the polymerization catalyst in the polyolefin to be substantially completely deactivated at the chosen flow of steam.

The deactivating stream (201) preferably comprises steam and a second inert gas. The second inert gas may preferably be nitrogen. In the cases where the second inert gas is added to the steam, the second inert gas is preferably added at such temperature that the condensation of steam is avoided. Preferably, the second inert gas is added at a temperature above the condensation temperature of steam. This has the advantage that the stickiness of the resulting polyolefin is reduced and that the steam is dispersed more evenly. Even dispersion of steam allows use of less steam while having a good deactivating effect.

Preferably, the process further comprises the step of feeding the polyolefin substantially free of active polymerization catalyst obtained by step h) to the extrusion unit (300). The extrusion unit (300) forms the polyolefin into desired shape, e.g. in the form of pellets.
product The color characteristics of polymer samples are determined on pellets. The tristimulus values L, a, b of these samples are measured on a Hunter Laboratory Color Difference Meter Model 25 DM according to the protocol of the supplier. A positive b value (also referred to herein as B-index) is representative of the yellow color of the sample. An increase in the numerical value determined for b represents an intensification of the yellow color.

The Hunter color values indicate coloration, with b less than or equal to 0 being colorless and positive values for the Hunter value "b" referring to yellow color.

The polyolefin that is substantially free of active polymerization catalyst obtained by step h) has a B-index (b value of Hunter L, a, b scale) which is lower than a reference polyolefin obtained by a process identical to the process of the present invention except in the absence of step h).

Preferably, the polyolefin that is substantially free of active polymerization catalyst obtained by step h) has a B-index (b value of Hunter L, a, b scale) which is at least 10%, more preferably at least 20%, more preferably at least 50%, even more preferably at least 60%, even more preferably at least 70%, even more preferably at least 80%, even more preferably at least 90%, even more preferably at least 95%, most preferably at least 100% lower than a reference polyolefin obtained by a process identical to the process of the present invention except in the absence of step h).

Preferably, the polyolefin that is substantially free of active polymerization catalyst obtained by step h) has a B-index (b value of Hunter L, a, b scale) which is at least 0.1, more preferably at least 0.2, more preferably at least 0.5, more preferably at least 0.7, more preferably at least 0.9, more preferably at least 1.1 lower than a reference polyolefin obtained by a process identical to the process of the present invention except in the absence of step h).

For example, the polyolefin that is substantially free of active polymerization catalyst obtained by step h) has a B-index of less than 3, less than 2 or less than 1.5, less than 1.2.
system According to a further aspect, the present invention relates to a reaction system for the preparation of a polyolefin from one or more α-olefin monomers of which at least one is ethylene or propylene, wherein the reaction system comprises a reactor (8), a product purge bin (100), a granular feed bin (200), wherein the granular feed bin (200) is located downstream of the product purge bin (100), a recovery unit (7) and an extrusion unit (300) directly coupled to the granular fed bin (200), wherein the reactor (8) comprises a fluidized bed, an expanded section (4) located at or near the top of the reactor (8), a distribution plate (6) located at the lower part of the reactor and an inlet for a recycle stream (10) located under the distribution plate (6), wherein the system is arranged such that a) a polymerization catalyst (20) is fed to the fluidized bed in the area above the distribution plate (6), b) the one or more α-olefin monomers is fed to the reactor (8), c) fluids are circulated from the top of the reactor to the bottom of the reactor (8), wherein the circulating fluids are cooled using a heat exchanger (5), resulting in a cooled recycle stream (10) comprising liquid, and wherein the cooled recycle stream (10) is introduced into the reactor (8) using the inlet for the recycle stream (10), d) a stream (30) comprising the polyolefin and fluids is withdrawn from the reactor and said stream is passed into the product purge bin, e) the product purge bin (100) is purged with a purge stream (101) comprising a first inert gas, preferably nitrogen, and steam such that a stream (110) comprising a purged polyolefin and a stream (102) comprising fluids, wherein the stream (102) comprising the fluids is substantially free of steam, is obtained, f) at least part of the stream (102) comprising the fluids is introduced back into the reactor (8) via the recovery unit (7), g) the stream (110) comprising the purged polyolefin is introduced into the granular feed bin (200) and h) contacting a deactivating stream (210) comprising steam with the purged polyolefin in the granular feed bin (200) to obtain a polyolefin (210) that is substantially free of active polymerization catalyst.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLE

Ethylene and 1-butene were polymerized using a Ziegler-Natta catalyst in the presence of hydrogen to produce LLDPE (MFI 5 g/10 min (ISO1133:2011, 190° C./2.16 kg) and 0.935 g/cm$^3$ density (ISO1872-2) in a system shown in FIG. 1.

When nitrogen was used to fluff the LLDPE powder present in the granular feed bin (GFB), the Hunter B-value (B-index) was measured in the range from 2.2-2.9. Within 3 hours after stopping the nitrogen and feeding steam to the GFB, the B-index dropped to a value of 1.2.

The B-index of the pellets produced during the polymerization was monitored for 11 hours. The B-Index of the pellets produced was checked every 1 hour. The B-Index was measured to be in the range of 2.2 to 2.9.

After the steam addition to the GFB was stopped and nitrogen was re-connected to fluff the product in the GFB, the B-index increased to 1.9.

The example was repeated and a similar drop in B-index was observed when flushing the GFB with steam.

The invention claimed is:

1. A process for the preparation of a polyolefin in a reaction system from one or more α-olefin monomers of which at least one is ethylene or propylene,
    wherein the reaction system comprises
        a reactor,
        a product purge bin,
        a granular feed bin located downstream of the product purge bin,
        a recovery unit, and
        an extrusion unit directly coupled to the granular feed bin,
    wherein the reactor comprises a fluidized bed, an expanded section located at or near the top of the reactor, a distribution plate located at the lower part of the reactor, and an inlet for a recycle stream located under the distribution plate,
    wherein the process comprises:
        a) feeding a polymerization catalyst to the fluidized bed in the area above the distribution plate,
        b) feeding the one or more α-olefin monomers to the reactor,
        c) circulating fluids from the top of the reactor to the bottom of the reactor, wherein the circulating fluids are cooled using a heat exchanger, resulting in a cooled recycle stream comprising liquid, and wherein the cooled recycle stream is introduced into the reactor using the inlet for the recycle stream,
        d) withdrawing a stream comprising the polyolefin and fluids from the reactor and passing said stream into the product purge bin,
        e) purging the product purge bin with a purge stream comprising a first inert gas and steam such that a stream comprising a purged polyolefin and a stream comprising fluids are obtained, wherein the stream comprising the fluids, which is a stream obtained directly from the product purge bin, is substantially free of steam,
        f) introducing at least part of the stream comprising the fluids back into the reactor via the recovery unit,
        g) introducing the stream comprising the purged polyolefin into the granular feed bin, and
        h) contacting a deactivating stream comprising steam with the purged polyolefin in the granular feed bin to obtain a polyolefin that is substantially free of active polymerization catalyst.

2. The process according to claim 1, wherein a second inert gas, is added to the deactivating stream in step h) such that condensation of the steam is avoided.

3. The process according to claim 1, further comprising the step of feeding the polyolefin that is substantially free of active polymerization catalyst to the extrusion unit.

4. The process according to claim 1, wherein the polyolefin is selected from the group of polypropylene and polyethylene.

5. The process according to claim 1, wherein the polyolefin that is substantially free of active polymerization catalyst obtained by step h) has a B-index which is at least 10% lower than a reference polyolefin obtained by a process identical to the process of the present invention except in the absence of step h).

6. The process according to claim 1, wherein nitrogen is added to the stream comprising the purged polyolefin, after which the stream comprising the purged polyolefin and nitrogen is introduced into the granular feed bin.

7. A reaction system for the preparation of a polyolefin from one or more α-olefin monomers of which at least one is ethylene or propylene,
    wherein the reaction system comprises:
        a reactor,
        a product purge bin,
        a granular feed bin downstream of the product purge bin,
        a recovery unit, and
        an extrusion unit directly coupled to the granular feed bin,
    wherein the reactor comprises a fluidized bed, an expanded section located at or near the top of the reactor, a distribution plate located at the lower part of the reactor and an inlet for a recycle stream located under the distribution plate, wherein the system is arranged such that
a) a polymerization catalyst is fed to the fluidized bed in the area above the distribution plate,
b) the one or more α-olefin monomers is fed to the reactor,
c) fluids are circulated from the top of the reactor to the bottom of the reactor, wherein the circulating fluids are cooled using a heat exchanger, resulting in a cooled recycle stream comprising liquid, and wherein the cooled recycle stream is introduced into the reactor using the inlet for the recycle stream,
d) a stream comprising the polyolefin and fluids is withdrawn from the reactor and said stream is passed into the product purge bin,
e) the product purge bin is purged with a purge stream comprising a first inert gas and steam such that a stream comprising a purged polyolefin and a stream comprising fluids are obtained, wherein the stream comprising the fluids, which is a stream obtained directly from the product purge bin, is substantially free of steam,
f) at least part of the stream comprising the fluids is introduced back into the reactor via the recovery unit,
g) the stream comprising the purged polyolefin is introduced into the granular feed bin and
h) contacting a deactivating stream comprising steam with the purged polyolefin in the granular feed bin to obtain a polyolefin that is substantially free of active polymerization catalyst.

8. The process according to claim 1, wherein the first inert gas is nitrogen.

9. The process according to claim 2, wherein the second inert gas is nitrogen.

10. The process according to claim 9, further comprising adding nitrogen above the condensation temperature of steam.

11. The process according to claim 4, wherein the polyolefin is high density polyethylene or linear low density polyethylene.

12. The reactor system of claim 7, wherein the first inert gas is nitrogen.

13. A process for the preparation of a polyolefin in a reaction system from one or more α-olefin monomers of which at least one is ethylene or propylene,
wherein the reaction system comprises
a reactor,
a product purge bin,
a granular feed bin located downstream of the product purge bin,
a recovery unit, and
an extrusion unit directly coupled to the granular feed bin,
wherein the reactor comprises a fluidized bed, an expanded section located at or near the top of the reactor, a distribution plate located at the lower part of the reactor, and an inlet for a recycle stream located under the distribution plate,
wherein the process comprises:
a) feeding a polymerization catalyst to the fluidized bed in the area above the distribution plate,
b) feeding the one or more α-olefin monomers to the reactor,
c) circulating fluids from the top of the reactor to the bottom of the reactor, wherein the circulating fluids are cooled using a heat exchanger, resulting in a cooled recycle stream comprising liquid, and wherein the cooled recycle stream is introduced into the reactor using the inlet for the recycle stream,
d) withdrawing a stream comprising the polyolefin and fluids from the reactor and passing said stream into the product purge bin,
e) purging the product purge bin with a purge stream comprising a first inert gas and steam such that a stream comprising a purged polyolefin and a stream comprising fluids are obtained, wherein the stream comprising the fluids is substantially free of steam,
f) introducing at least part of the stream comprising the fluids back into the reactor via the recovery unit,
g) introducing the stream comprising the purged polyolefin into the granular feed bin, and
h) contacting a deactivating stream comprising steam with the purged polyolefin in the granular feed bin to obtain a polyolefin that is substantially free of active polymerization catalyst, wherein the stream comprising the purged polyolefin is introduced directly into the granular feed bin.

14. The process of claim 1, wherein the stream comprising the fluids comprises less than or equal to 5 ppmv of steam.

15. The process of claim 1, wherein the purging of the product purge bin with the purge stream comprises removal of dissolved hydrocarbon from the polyolefin and fluids from the reactor.

16. The process of claim 15, wherein the purged polyolefin comprises active polymerization catalyst, and the contacting of the deactivating stream with the purged polyolefin in the granular feed bin deactivates the active polymerization catalyst.

* * * * *